Patented June 18, 1940

2,205,187

UNITED STATES PATENT OFFICE 2,205,187

PURIFICATION OF HALOGENATED HYDROCARBONS

Frank M. Clark, Pittsfield, Mass., assignor to General Electric Company, a corporation of New York No Drawing. Application July 31, 1936, Serial No. 93,655

5 Claims. (Cl. 260—649)

The present invention comprises a method for removing finely-divided suspended carbon from liquid or liquefied organic compounds, and in particular from halogen substitution products of aromatic hydrocarbon compounds, such, for example, as the chlorination compounds of benzene, diphenyl, naphthalene and the like, or mixtures thereof.

When such compounds are decomposed, as, for example, by an electric arc passing therethrough, hydrogen halide gas is evolved and an abundant amount of carbon of extreme fineness is liberated by the breakdown of the molecule. Such carbon being of colloidal fineness cannot be removed from a liquid in which it is suspended by ordinary filtration or by centrifugal separation.

In accordance with my present invention, substantially complete removal of the suspended unfiltratable carbon from a halogenated hydrocarbon can be effected by a water solution of a compound containing polyvalent ions, preferably polyvalent cations such, for example, as sulphates of copper or aluminum. Such solutions which contain polyvalent anions as well as polyvalent cations, when dispersed in the liquid to be purified so act upon the finely-divided carbon that when the water solution is separated from the halogenated organic compound, the carbon particles are carried off substantially completely with the water solution.

I prefer to employ dilute solutions in carrying out my invention. A three per cent solution by weight has been found to be suitable but, of course, I do not wish to be limited to this particular concentration and, as a matter of fact, higher concentrations in some cases can be used with greater efficiency. Ordinarily, however, the use of an aqueous solution having a concentration less than three per cent for purification of carbonized liquid is accompanied by a corresponding decrease in efficiency. I prefer also to employ about 20 parts by weight of the salt solution for 80 parts of the carbonized hydrocarbon. The use of lesser amounts of salt solution than about 20 per cent results in decreased efficiency in carbon removal. It is also preferred to operate at a temperature higher than room temperature and ordinarily, within the limits of about 50 to 80° C.

The aqueous solution is caused to be dispersed in fine droplets in the liquid to be purified, for example, by stirring or some other form of agitation. The dispersion or mixture of solution and carbon-containing, halogenated liquid is allowed to stand preferably at an elevated temperature, for example, a temperature within the range of 50 to 80° C. Thereby, the lighter water solution comes to the top and carries it with the carbon particles. Ordinarily the carbon is mainly concentrated as an intermediate layer between the supernatent aqueous solution and the underlying purified hydrocarbon. The purified hydrocarbon compound is siphoned off or otherwise removed. It is subjected to any well known mechanical method of purification to remove any entrained droplets of salt solution which may be present. The purification step may be carried out by an ordinary filter press in which the liquid to be purified is caused to pass through absorptive paper, or the purification may be carried out by means of centrifugal separation.

After purification, as by filtration or centrifugal separation, the liquid hydrocarbon is substantially free of suspended impurities, that is, free from carbon and droplets of water solution, and has a high electrical resistivity. For example, a mixture consisting of 60 parts by weight chlorinated diphenyl (60% chlorine) and 40 parts by weight trichlorbenzene when thus freed from carbon was found to have a dielectric strength at least as high as 30 kilovolts in a test utilizing a $\frac{1}{10}$th inch gap and the application of 60 cycle voltage, as described in the procedure of the American Society for Testing Materials under the designation D117.

While the purified liquid thus obtained is substantially devoid of salt contaminations and has relatively superior electrical properties, its resistivity may be still further increased and its power factor decreased by treating the same with fuller's earth as described in the prior patent to Clark, No. 1,994,302 of March 12, 1935. The product of such second purification is characterized by an electrical resistivity at 100° C., at least as high as $500 \times 10^9$ ohms/cm.$^3$, and a power factor as low as 5 per cent measured at 30 volts per mil 60 cycles, 100° C.

While sulphates of other polyvalent metal, such as iron and zinc, also may be used in accordance with my invention, the sulphates of copper and aluminum are preferred. As a general rule I prefer to employ for the purposes of my invention solutions containing polyvalent cations, such as cations of copper, aluminum and iron.

My invention is applicable not only to halogenated compounds which are liquid at room temperature, but also to normally solid compounds of this type which may be treated at temperatures above their melting point.

In accordance with a modification of my invention the aqueous solution of a salt of a polyvalent metal with which the carbon-containing liquid is treated is associated with a strong alkali, for example, sodium, potassium or ammonium hydroxide, which is capable of forming a flocculent precipitate by chemical reaction with the salt.

The following illustrative examples will further explain this modification of my invention. Ten parts of a three percent ferrous sulphate solution in water are thoroughly mixed with 80 parts (by weight) of the carbon-contaminated composition, either as liquid or melted solid. After the water solution has been brought into intimate contact with the carbonized liquid, preferably at a temperature at least as high as 50° C., 10 parts of a three percent sodium hydroxide solution in water for each 80 parts of the carbonized liquid are slowly stirred into the mixture. As a result of the reaction which occurs between the ferrous sulphate and the sodium hydroxide a flocculent precipitate is formed throughout the mixture. After this addition of sodium hydroxide solution, the agitation is continued for approximately two minutes or longer depending upon the efficiency of the agitating means. At the end of the agitation the water solution and the liquid hydrocarbon should be in intimate contact, that is, the water solution should be dispersed as fine globules throughout the mass of the liquid hydrocarbon. The aqueous solution is then caused to be separated, for example, by gravitational separation upon standing or by treatment in a centrifugal separator. If the mixture is allowed to stand in order to separate gravitationally, it should be maintained at a sufficiently high temperature to reduce the viscosity of the liquid hydrocarbon, preferably to a value less than 100 Saybolt Universal seconds. Upon separation of the liquid hydrocarbon and the water solution, it will be found that the carbon has passed from the liquid hydrocarbon into the water solution with which it may be removed.

A carbonized liquid chlorinated hydrocarbon having a viscosity of 60 seconds Saybolt Universal at 37.8° C., (and consisting of a 60:40 mixture of chlorinated diphenyl and chlorinated benzene), when treated in accordance with the described modified method, upon twenty minutes' standing at 25° C. becomes separated in two components, namely, the water solution with its content of carbon and the body of the purified chlorinated hydrocarbon. The carbon particles in this case also appear to be concentrated in a layer between the chlorinated hydrocarbon and the supernatent water solution.

The liquid chlorinated hydrocarbon preferably is filtered through a filter of porous paper or is subjected to centrifugal treatment in order to completely eliminate any traces of water solution which it may contain. It has been found that a hydrocarbon liquid freed from carbon in accordance with this procedure shows no traces of dissolved salts and possesses a dielectric strength at room temperature of at least as high as 30 kilovolts when tested according to the standard procedure above identified. Further improvements in electrical properties may be effected by treatment with fuller's earth in accordance with the above-mentioned prior Clark Patent No. 1,994,302 of March 12, 1935.

What I claim as new and desire to secure by Letters Patent of the United States is:

1. The method of purifying a liquid halogenated hydrocarbon containing unfilterable, finely-divided carbon which consists in dispersing throughout said halogenated hydrocarbon a dilute aqueous solution containing at least about 3 per cent by weight of salt producing polyvalent cations in such solution, thereby causing the suspended carbon to be extracted from said halogenated hydrocarbon by said solution and separating said aqueous solution together with the carbon particles from said halogenated hydrocarbon.

2. The method of removing finely-divided carbon from a chlorinated aromatic hydrocarbon compound which comprises adding thereto while said compound is in a liquid state about 20 per cent by weight of a dilute aqueous solution of a sulphate of a polyvalent metal, causing said solution to be dispersed as fine droplets in said compound, whereby the carbon is extracted from said compound, and separating said solution together with the carbon from said compound.

3. The method of purifying a liquid chlorinated aromatic hydrocarbon containing in suspension unfilterable carbon particles which comprises dispersing throughout said chlorinated hydrocarbon a dilute aqueous solution containing polyvalent anions and polyvalent cations, whereby such carbon particles are extracted by said solution from said chlorinated hydrocarbon, and separating said aqueous solution together with carbon particles from said chlorinated hydrocarbon.

4. The method of purifying a liquid chlorinated hydrocarbon containing finely-divided carbon which consists in dispersing in said liquid chlorinated hydrocarbon a dilute aqueous solution of copper sulphate, thereby causing carbon particles to pass from said chlorinated hydrocarbon into said solution and thereupon removing said solution together with the carbon from said chlorinated hydrocarbon.

5. The method of removing suspended, finely-divided carbon from a chlorinated hydrocarbon which consists in bringing said chlorinated hydrocarbon at a temperature of about 50 to 80° C. into intimate contact with an aqueous solution containing about 3 per cent by weight of copper sulphate, at least about 20 parts by weight of said solution being used with 80 parts of chlorinated hydrocarbon to be purified, whereby the suspended carbon is caused to pass from the chlorinated hydrocarbon into the solution, and separating said solution with the carbon taken up thereby from the purified hydrocarbon.

FRANK M. CLARK.